Figure 1:
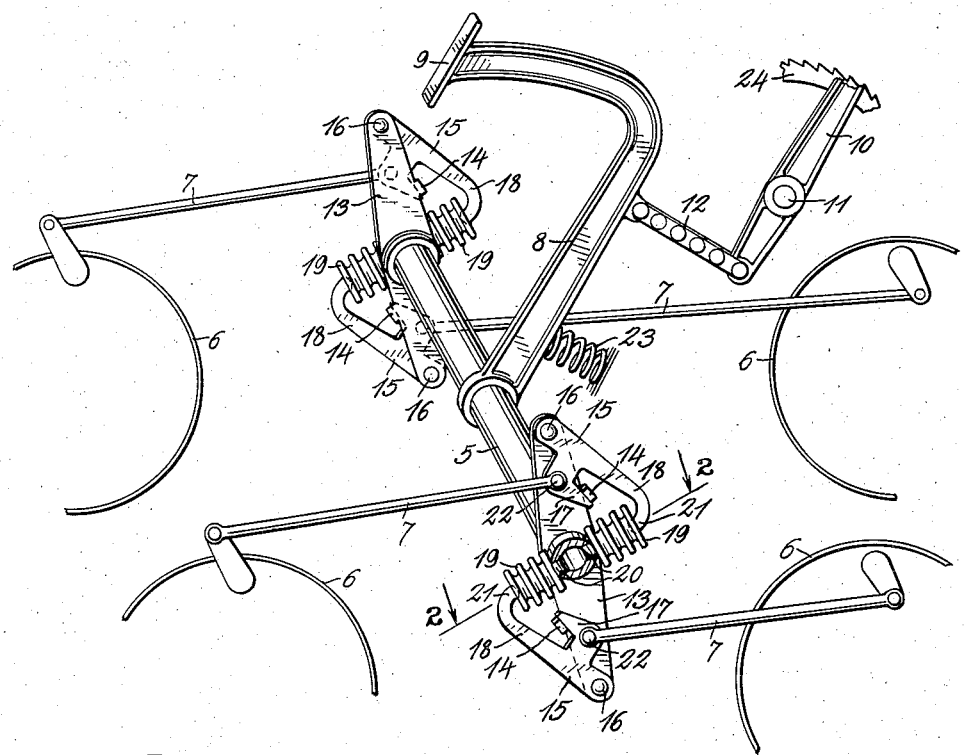

Jan. 3, 1939.   B. McINNERNEY   2,142,364

HYDRAULICALLY EQUALIZED MECHANICAL BRAKE

Filed Aug. 30, 1937

INVENTOR.
Benjamin McInnerney.
BY Martin E. Anderson
ATTORNEY.

Patented Jan. 3, 1939

2,142,364

UNITED STATES PATENT OFFICE 2,142,364

HYDRAULICALLY EQUALIZED MECHANICAL BRAKE

Benjamin McInnerney, Omaha, Nebr.

Application August 30, 1937, Serial No. 161,572

3 Claims. (Cl. 188—204)

This invention relates to improvements in automobile brakes of the type known as "mechanical brakes" as distinguished from hydraulic brakes.

In automobile practice all four wheels are now equipped with brakes in order to bring to a stop as quickly as possible the present high speed cars.

It is obvious that, if the best effects are to be obtained, the brakes must be so adjusted that the braking effect will be the same for all of the wheels or, at least, for the two front and the two rear wheels.

It is argued that some advantage is gained by having the brake action different for the front and the rear wheels, but all are agreed that the braking action on the two front wheels should be equal and also for the rear wheels.

Purely mechanical brakes are recognized as being the most reliable because the forces are transmitted by steel rods or cables that are practically proof against failure. Owing to several reasons, it is difficult to so adjust mechanical brakes that the main braking force will be properly proportioned between the several brake drums, and if such adjustment is effected in the garage, it frequently changes after the brakes have been used a short time.

In order to assure the proper distribution of the main braking force between the several brake drums, brakes of the type known as "hydraulic brakes" are extensively employed. Hydraulic brakes sometimes fail, due to leakage of the pressure fluid and lately it has been found desirable to equip automobiles with both hydraulic and mechanical brakes.

It is evident that if some simple means can be found that will assure a proper distribution of the braking force between the several brake drums, mechanical brakes will have apparent advantages over hydraulic brakes, both as to first cost, upkeep and reliability.

It is the object of this invention to produce a brake of the mechanical type in which the braking force will be proportioned between the several brake drums by hydraulic means, or in other words, a brake in which the braking force is mechanically applied and hydraulically equalized or proportioned.

Another object is to produce a hydraulic equalizing or force distributing means that can be readily applied to any car equipped with mechanical brakes and which will therefore serve as a replacement part.

This invention briefly described consists in interposing in the connections between the brake pedal, lever or other braking force producing means, and the several brake rods that run to the brakes on the wheels, a hydraulic force transmitting means comprising a piston and a cylinder containing a fluid, such as oil, that transmits the force to the pistons, and interconnecting the pressure fluid so that all of the pistons will be acted upon by fluid of the same pressure, whereby the forces transmitted to the brake rods will be proportional to the cross sectional areas of the pistons. Instead of pistons and cylinders, other equivalent means, such as sylphons may be used.

In the usual hydraulic brakes the pressure fluid is in communication with certain pressure responsive apparatus in the brake housings through tubing, some portions of which are flexible. Since the brake housings are constantly moving relative to the body, the conduits are being constantly flexed and as a result sometimes break.

It is an object of this invention to produce a hydraulic force equalizing device in which the conduits that contain the pressure fluid are never subject to any bending strains and the conduits may therefore be made of heavy steel, copper or brass tubing that will not break and in this way failure of the brakes due to leakage will be almost entirely obviated.

Another object of this invention is to produce a mechanically applied, hydraulically equalized brake that will remain effective even if the hydraulic equalizing mechanism becomes inoperative.

A still further object of this invention is to provide a mechanical brake with a hydraulic equalizing means so constructed that any liquid lost by ordinary leakage will be automatically replaced.

Figure 2:
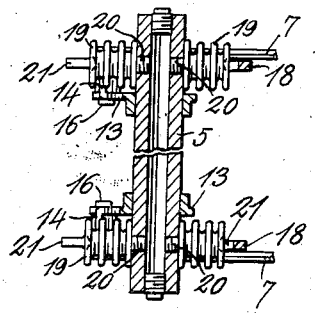

The above and other objects that may become apparent as the description proceeds are attained by means of a construction and arrangement of parts that will now be described in detail, and reference for this purpose will be had to the accompanying drawing in which the invention has been illustrated and in which:

Figure 1 is a diagrammatic representation of the invention, illustrating one form of the invention as applied to a four wheel brake arrangement; and Figure 2 is a section taken on line 2—2 Fig. 1.

The invention has been illustrated in a more or less diagrammatic manner as the invention is exceedingly simple.

Numeral 5 designates a shaft which is mounted for limited rocking movement in suitable bearings, which have not been shown, and numerals 6 designate four brake drums. No attempt has been made to show the mechanism of the brakes as any suitable brakes may be used. Each brake is provided with a tension member 7 by means of which the force required to set the brakes is transmitted. Secured to the shaft is an operating member 8, which has been illustrated as a foot pedal having its free end provided with a flattened portion 9 to which the pressure is applied by the driver's foot. A hand brake lever 10, pivoted at 11 has been shown as connected with the foot pedal by means of a chain 12. Attached to the shaft, at opposite sides of the foot pedal, and preferably adjacent the ends of the shaft, are crank arms 13 that extend equal distances on opposite sides of the center of the shaft. Each crank arm is provided with two lugs 14 that serve as stops for levers 15 that are pivotally attached to the crank arms at 16. The levers have two spaced arms 17 and 18 whose adjacent edges are spaced apart and between which the lugs 14 are positioned. It will be observed that the lugs 14 limit the movement of the levers in both directions. Attached to the shaft, adjacent each crank arm 13, are two housings 19. In the embodiment illustrated housings 19 are pleated metal tubes of the kind usually designated as "sylphons". Each of the housings have a tubular threaded nipple 20 that screws into a threaded hole in shaft. The four housings are in communication with each other through the threaded nipples 20 and the hollow shaft and form in effect a single chamber for the reception of a pressure fluid such as a light oil that will not harden when it becomes cold. The outer ends of the housings are closed by an end wall against which the curved ends 21 of the levers press when the brakes are set. Since the "sylphons" are hermetically sealed and the connections between the nipples 20 and the shaft may be welded or soldered and since the ends of the hollow shaft may be closed by plugs soldered or welded in place, it is evident that any liquid contained in the "sylphons" and the pipe has no opportunity of escaping as there can be no leakage unless the material breaks.

Let us now assume that the chamber formed by the "sylphons" and the shaft contains a liquid such as a light oil, and that pressure is applied to plate 9 tending to turn shaft clockwise. The pivots 22 will rotate clockwise and impart to the rods 7 a corresponding movement. As soon as the brakes begin to set the tension in the rod 7 begins to increase and this forces the ends 21 against the end walls of the "sylphons". Since interiors of all of the "sylphons" are in communication, the pressure in all will be the same. It is necessary that the parts shall be so adjusted that the stops 14 are normally out of contact with the edges of arms 17 and 18. If the effective areas of the "sylphons" are equal, the tension in rods 7 will be equal, but if a greater tension is desired in one or more rods than in the others, this can be effected by associating such rod or rods with "sylphons" of greater effective diameters, and in this way the forces may be proportioned in any manner desired. The brake mechanisms in the brake drums are supplied with spring means that functions to release the brakes and to bring the parts to the inoperative position shown, but as these are not visible, a compression spring 23 has been shown as performing this function.

The assembly comprising the shaft and the several parts attached thereto is self-contained and may be sold as a unit and can be substituted for the usual brake shaft that corresponds to shaft. When the assembly shown in Fig. 1 and described above is substituted for the ordinary crank shaft, in a mechanical brake, the forces applied to each brake can be equalized or proportioned as desired. Since the chamber containing the pressure fluid is hermetically sealed the fluid cannot escape. If a leak should accidentally develop, the brakes would still function because the stops 14 will engage the edges of arms 18 and the brake will then function as an unequalized mechanical brake.

By means of the lever 10, which is connected with the foot pedal by means of a chain 12 or other flexible member, the service brake can also be used as an emergency brake. Lever 10 is provided with the usual pawl that engages the ratchet teeth on quadrant 24.

It is well understood that a "sylphon" is the mechanical equivalent for a cylinder and a piston in many mechanical devices and a force proportioning device or equalizer may be used in which the "sylphons" are replaced by cylinders and pistons. Instead of a hollow shaft a separate tube may be employed to connect the pressure fluid chambers at opposite ends of the shaft.

Let us now assume that the device shown in Fig. 1 is applied to an automobile and with a front and a rear wheel brake. When pressure is exerted on pedal 9 the assembly will turn in a clockwise direction and the pivots 22 will move so as to exert a pull on the rods 7. When the brakes begin to set the closed ends of the "sylphons" will tend to move inwardly and put the oil under pressure thereby proportioning tension in the rods 7 in accordance with the effective cross sectional areas of the sylphons.

In case a rod 7 breaks the corresponding sylphon will remain in the position shown in Fig. 1 due to the interaction of the lug 14 with arm 17.

Attention is directed in particular to one distinguishing feature of the construction which is of great practical importance, namely, that the movable end walls of the "sylphons" are positioned on opposite sides of a plane containing the axis of the shaft. The positioning of the capacity changing means of the fluid chamber on opposite sides of a plane containing the axis of the shaft makes it possible to employ a very simple construction as it thus becomes possible to connect rods 7 directly with the ends of the pistons and with the levers that engage the ends of the sylphons. By the simple expedient of arranging the capacity changing means, as shown and described, only a single shaft is required and this may also serve as a conduit for effecting equalization of the fluid pressure.

Having described the invention what is claimed as new is—

1. Means for subdividing a given force in predetermined proportions between two force responsive devices, comprising, in combination, a hollow shaft mounted for oscillation about an axis, means for oscillating the shaft, a housing whose interior forms a pressure fluid chamber, carried by the shaft, the chamber being formed in part by two "sylphons" having movable end walls positioned on opposite sides of the axis of the shaft, a crank arm attached near its center to the shaft adjacent the housing, levers pivoted at one end to the ends of the crank arms, the free ends of the levers contacting the movable end walls of the housing stop means, independent of the sylphons, for limiting the oscillation of the levers about these pivots in both directions, and a tension member having one end connected with each lever and the other end connected with a force responsive device, the parts being so arranged that when the shaft is rocked in one direction the free ends of the levers will exert pressure on the movable end walls in a direction to decrease the capacity of the fluid chamber.

2. A brake mechanism for vehicles having a plurality of brakes, comprising a shaft mounted for rotation about its axis, a double ended crank arm extending transversely of the shaft, a pair of "sylphons", their interiors being in communication to form a chamber, attached to the shaft, the outer end wall of each "sylphon" being movable, the end walls being on opposite sides of a plane passing through the axis of the shaft, levers pivotally connected with the crank arms for engagement with the movable end walls, and means comprising a tension rod connected with each lever at a point between its pivotal connection with the crank arm and the point of engagement with the sylphon and with a brake in such a way that when the shaft is rotated about its axis the tension rod exerts a force on the brakes tending to set them and at the same time exert a corresponding force on the levers in a direction to move the end walls of the "sylphons" in a direction to decrease the capacity of the chamber, whereby the forces exerted on the brakes will be a predetermined proportion of the pressure of the fluid in the "sylphons," and interengaging means on the crank arm and the lever for limiting the pivotal movement of the latter in both directions.

3. In a four wheel brake mechanism, a force distributing and proportioning device comprising, a hollow shaft mounted for limited rocking movement about its axis, means for applying a torque to the shaft to turn it in one direction, the shaft having attached thereto, two longitudinally spaced crank arms, each crank arm extending to both sides of the center of the shaft, two liquid containing "sylphons" supported by the shaft adjacent each crank arm, one on each side of a plane containing the axis of the shaft, each "sylphon" having an imperforate movable end wall for varying the capacity thereof, the four "sylphons" having their interiors interconnected, through the shaft, to equalize the liquid pressure in all, force transmitting mechanisms comprising levers pivoted to the ends of crank arms and tension rods pivoted to the levers intermediate their ends, for transmitting force from each brake mechanism to the movable end wall of a "sylphon", the parts being so arranged that when the shaft is turned in one direction a force will be transmitted to each brake for setting the same, the force transmitting means tending to move the end walls of the "sylphons" inwardly when force is transmitted to the brakes, whereby the values of the several forces will be proportional to the liquid pressure in the "sylphons", and means, independent of the sylphons, for limiting the pivotal movements of the levers in both directions.

BENJAMIN McINNERNEY